United States Patent
Kenrich et al.

(10) Patent No.: US 7,707,427 B1
(45) Date of Patent: Apr. 27, 2010

(54) MULTI-LEVEL FILE DIGESTS

(76) Inventors: Michael Frederick Kenrich, 335 Beach Dr., Aptos, CA (US) 95003; Yevgeniy Gutnik, 1055 Manet Dr., Apt. 33, Sunnyvale, CA (US) 94087

(*) Notice: Subject to any disclaimer, the term of this patent is extended or adjusted under 35 U.S.C. 154(b) by 1043 days.

(21) Appl. No.: 10/894,493

(22) Filed: Jul. 19, 2004

(51) Int. Cl.
*H04L 9/18* (2006.01)
*H04L 9/20* (2006.01)

(52) U.S. Cl. .............. 713/181; 713/165; 380/37
(58) Field of Classification Search .......... 713/160, 713/165, 181; 380/37, 42
See application file for complete search history.

(56) References Cited

U.S. PATENT DOCUMENTS

| | | | |
|---|---|---|---|
| 4,203,166 A | 5/1980 | Eshram et al. |
| 4,734,568 A | 3/1988 | Watanabe |
| 4,757,533 A | 7/1988 | Allen et al. |
| 4,796,220 A | 1/1989 | Wolfe |
| 4,799,258 A | 1/1989 | Davies |
| 4,827,508 A | 5/1989 | Shear |
| 4,888,800 A | 12/1989 | Marshall et al. |
| 4,972,472 A | 11/1990 | Brown et al. |
| 5,032,979 A | 7/1991 | Hecht et al. |
| 5,052,040 A | 9/1991 | Preston et al. |
| 5,058,164 A | 10/1991 | Elmer et al. |
| 5,144,660 A | 9/1992 | Rose |
| 5,204,897 A | 4/1993 | Wyman |
| 5,220,657 A | 6/1993 | Bly et al. |
| 5,235,641 A | 8/1993 | Nozawa et al. |
| 5,247,575 A | 9/1993 | Sprague et al. |
| 5,276,735 A | 1/1994 | Boebert et al. |
| 5,301,247 A | 4/1994 | Rasmussen et al. |
| 5,319,705 A | 6/1994 | Halter et al. |
| 5,369,702 A | 11/1994 | Shanton |
| 5,375,169 A | 12/1994 | Seheidt et al. |
| 5,404,404 A | 4/1995 | Novorita |
| 5,406,628 A | 4/1995 | Beller et al. |

(Continued)

FOREIGN PATENT DOCUMENTS

EP   0 672 991 A2   9/1995

(Continued)

OTHER PUBLICATIONS

Expiration Mechanism for Chipcards, IBM Technical Disclosure Bulletin, Oct. 1, 2001, UK.

(Continued)

*Primary Examiner*—Jung Kim
*Assistant Examiner*—Venkat Perungavoor
(74) *Attorney, Agent, or Firm*—Sterne, Kessler, Goldstein & Fox PLLC (57) ABSTRACT

Multi-level file digests for electronic files are disclosed. A top level digest represents a single digest for the associated electronic file. Lower level digests represent digests for portions of the associated electronic file. The top level digest is derived from the lower level digests. The top level digest is useful for facilitating rapid comparison to determine whether electronic files are the same. In one embodiment, electronic files are encrypted with a block encryption scheme, and digests are efficiently calculated and stored on a block-by-block basis. Advantageously, when modifications to an encrypted electronic file occurs, only those modified blocks need to be processed to undergo decryption and re-encryption to determine the appropriate digest.

21 Claims, 7 Drawing Sheets

U.S. PATENT DOCUMENTS

| | | |
|---|---|---|
| 5,414,852 A | 5/1995 | Kramer et al. |
| 5,495,533 A | 2/1996 | Linehan et al. |
| 5,499,297 A | 3/1996 | Boebert |
| 5,502,766 A | 3/1996 | Boebert et al. |
| 5,535,375 A | 7/1996 | Eshel et al. |
| 5,557,765 A | 9/1996 | Lipner et al. |
| 5,570,108 A | 10/1996 | McLaughlin et al. |
| 5,584,023 A | 12/1996 | Hsu |
| 5,600,722 A | 2/1997 | Yamaguchi et al. |
| 5,606,663 A | 2/1997 | Kadooka |
| 5,655,119 A | 8/1997 | Davy |
| 5,661,806 A | 8/1997 | Nevoux et al. |
| 5,671,412 A | 9/1997 | Christiano |
| 5,673,316 A | 9/1997 | Auerbach et al. |
| 5,677,953 A | 10/1997 | Dolphin |
| 5,680,452 A | 10/1997 | Shanton |
| 5,684,987 A | 11/1997 | Mamiya et al. |
| 5,689,718 A | 11/1997 | Sakurai et al. |
| 5,699,428 A | 12/1997 | McDonnal et al. |
| 5,708,709 A | 1/1998 | Rose |
| 5,715,403 A | 2/1998 | Stefik |
| 5,717,755 A | 2/1998 | Shanton |
| 5,720,033 A | 2/1998 | Deo |
| 5,729,734 A | 3/1998 | Parker et al. |
| 5,732,265 A | 3/1998 | Dewitt et al. |
| 5,745,573 A | 4/1998 | Lipner et al. |
| 5,748,736 A | 5/1998 | Mittra |
| 5,751,287 A | 5/1998 | Hahn et al. |
| 5,757,920 A | 5/1998 | Misra et al. |
| 5,765,152 A | 6/1998 | Ericson |
| 5,778,065 A | 7/1998 | Hauser et al. |
| 5,787,169 A | 7/1998 | Eldridge et al. |
| 5,787,173 A | 7/1998 | Seheidt et al. |
| 5,787,175 A | 7/1998 | Carter |
| 5,790,789 A | 8/1998 | Suarez |
| 5,790,790 A | 8/1998 | Smith et al. |
| 5,813,009 A | 9/1998 | Johnson et al. |
| 5,821,933 A | 10/1998 | Keller et al. |
| 5,825,876 A | 10/1998 | Peterson |
| 5,835,592 A | 11/1998 | Chang et al. |
| 5,835,601 A | 11/1998 | Shimbo et al. |
| 5,857,189 A | 1/1999 | Riddle |
| 5,862,325 A | 1/1999 | Reed et al. |
| 5,870,468 A | 2/1999 | Harrison |
| 5,870,477 A | 2/1999 | Sasaki et al. |
| 5,881,287 A | 3/1999 | Mast |
| 5,892,900 A | 4/1999 | Ginter et al. |
| 5,893,084 A | 4/1999 | Morgan et al. |
| 5,898,781 A | 4/1999 | Shanton |
| 5,922,073 A | 7/1999 | Shimada |
| 5,923,754 A | 7/1999 | Angelo et al. |
| 5,933,498 A | 8/1999 | Schnek et al. |
| 5,944,794 A | 8/1999 | Okamoto et al. |
| 5,953,419 A | 9/1999 | Lohstroh et al. |
| 5,968,177 A | 10/1999 | Batten-Carew et al. |
| 5,970,502 A | 10/1999 | Salkewicz et al. |
| 5,987,440 A | 11/1999 | O'Neil et al. |
| 5,991,879 A | 11/1999 | Still |
| 5,999,907 A | 12/1999 | Donner |
| 6,014,730 A | 1/2000 | Ohtsu |
| 6,023,506 A | 2/2000 | Ote et al. |
| 6,032,216 A | 2/2000 | Schmuck et al. |
| 6,038,322 A | 3/2000 | Harkins |
| 6,044,155 A | 3/2000 | Thomlinson et al. |
| 6,055,314 A | 4/2000 | Spies et al. |
| 6,058,424 A | 5/2000 | Dixon et al. |
| 6,061,790 A | 5/2000 | Bodnar |
| 6,069,957 A | 5/2000 | Richards |
| 6,085,323 A | 7/2000 | Shimizu et al. |
| 6,088,717 A | 7/2000 | Reed et al. |
| 6,088,805 A | 7/2000 | Davis et al. |
| 6,098,056 A | 8/2000 | Rusnak et al. |
| 6,101,507 A | 8/2000 | Cane et al. |
| 6,105,131 A | 8/2000 | Carroll |
| 6,122,630 A | 9/2000 | Strickler et al. |
| 6,134,327 A | 10/2000 | Van Oorschot |
| 6,134,658 A | 10/2000 | Multerer et al. |
| 6,134,660 A | 10/2000 | Boneh et al. |
| 6,134,664 A | 10/2000 | Walker |
| 6,141,754 A | 10/2000 | Choy |
| 6,145,084 A | 11/2000 | Zuili |
| 6,158,010 A | 12/2000 | Moriconi et al. |
| 6,161,139 A | 12/2000 | Win et al. |
| 6,182,142 B1 | 1/2001 | Win et al. |
| 6,185,684 B1 | 2/2001 | Pravetz et al. |
| 6,192,408 B1 | 2/2001 | Vahalia et al. |
| 6,205,549 B1 | 3/2001 | Pravetz et al. |
| 6,212,561 B1 | 4/2001 | Sitaraman et al. |
| 6,223,285 B1 | 4/2001 | Komuro et al. |
| 6,226,618 B1 | 5/2001 | Downs et al. |
| 6,226,745 B1 | 5/2001 | Wiederhold et al. |
| 6,240,188 B1 | 5/2001 | Dondeti et al. |
| 6,249,873 B1 | 6/2001 | Richard et al. |
| 6,253,193 B1 | 6/2001 | Ginter et al. |
| 6,260,040 B1 | 7/2001 | Kauffman et al. |
| 6,260,141 B1 | 7/2001 | Park |
| 6,263,348 B1 | 7/2001 | Kathrow et al. |
| 6,272,631 B1 | 8/2001 | Thomlinson et al. |
| 6,272,632 B1 | 8/2001 | Carman et al. |
| 6,282,649 B1 | 8/2001 | Lambert et al. |
| 6,289,450 B1 | 9/2001 | Pensak et al. |
| 6,292,895 B1 | 9/2001 | Baltzley |
| 6,292,899 B1 | 9/2001 | McBride |
| 6,295,361 B1 | 9/2001 | Kadansky et al. |
| 6,301,614 B1 | 10/2001 | Najork et al. |
| 6,308,256 B1 | 10/2001 | Folmsbee |
| 6,308,273 B1 | 10/2001 | Goertzel et al. |
| 6,314,409 B2 | 11/2001 | Schnek et al. |
| 6,317,777 B1 | 11/2001 | Skarbo et al. |
| 6,332,025 B2 | 12/2001 | Takahashi et al. |
| 6,336,114 B1 | 1/2002 | Garrison |
| 6,339,423 B1 | 1/2002 | Sampson et al. |
| 6,339,825 B2 | 1/2002 | Pensak et al. |
| 6,341,164 B1 | 1/2002 | Dilkie et al. |
| 6,343,316 B1 | 1/2002 | Sakata |
| 6,347,374 B1 | 2/2002 | Drake et al. |
| 6,349,337 B1 | 2/2002 | Parsons et al. |
| 6,351,813 B1 | 2/2002 | Mooney et al. |
| 6,356,903 B1 | 3/2002 | Baxter et al. |
| 6,356,941 B1 | 3/2002 | Cohen |
| 6,357,010 B1 | 3/2002 | Viets et al. |
| 6,363,480 B1 | 3/2002 | Perlman |
| 6,370,249 B1 | 4/2002 | Van Oorschot |
| 6,381,698 B1 | 4/2002 | Devanbu et al. |
| 6,389,433 B1 | 5/2002 | Bolosky et al. |
| 6,389,538 B1 | 5/2002 | Gruse et al. |
| 6,393,420 B1 | 5/2002 | Peters |
| 6,405,315 B1 | 6/2002 | Burns et al. |
| 6,421,714 B1 | 7/2002 | Rai et al. |
| 6,442,688 B1 | 8/2002 | Moses et al. |
| 6,442,695 B1 | 8/2002 | Dutcher et al. |
| 6,446,090 B1 | 9/2002 | Hart |
| 6,449,721 B1 | 9/2002 | Pensak et al. |
| 6,453,353 B1 | 9/2002 | Win et al. |
| 6,466,932 B1 | 10/2002 | Dennis et al. |
| 6,477,544 B1 | 11/2002 | Bolosky et al. |
| 6,490,680 B1 | 12/2002 | Scheidt et al. |
| 6,505,300 B2 | 1/2003 | Chan et al. |
| 6,510,349 B1 | 1/2003 | Schnek et al. |
| 6,519,700 B1 | 2/2003 | Ram et al. |
| 6,529,956 B1 | 3/2003 | Smith et al. |
| 6,530,020 B1 | 3/2003 | Aoki |
| 6,530,024 B1 | 3/2003 | Proctor |
| 6,542,608 B2 | 4/2003 | Scheidt et al. |

| | | | |
|---|---|---|---|
| 6,549,623 B1 | 4/2003 | Scheidt et al. | |
| 6,550,011 B1 | 4/2003 | Sims | |
| 6,557,039 B1 | 4/2003 | Leong et al. | |
| 6,567,914 B1 | 5/2003 | Just et al. | |
| 6,571,291 B1 | 5/2003 | Chow | |
| 6,584,466 B1 | 6/2003 | Serbinis et al. | |
| 6,587,946 B1 | 7/2003 | Jakobsson | |
| 6,588,673 B1 | 7/2003 | Chan et al. | |
| 6,594,662 B1 | 7/2003 | Sieffert et al. | |
| 6,598,161 B1 | 7/2003 | Kluttz et al. | |
| 6,603,857 B1 | 8/2003 | Batten-Carew et al. | |
| 6,608,636 B1 | 8/2003 | Roseman | |
| 6,611,599 B2 * | 8/2003 | Natarajan | 380/203 |
| 6,611,846 B1 | 8/2003 | Stoodley | |
| 6,615,349 B1 | 9/2003 | Hair | |
| 6,615,350 B1 | 9/2003 | Schell et al. | |
| 6,625,650 B2 | 9/2003 | Stelliga | |
| 6,629,243 B1 | 9/2003 | Kleinman et al. | |
| 6,633,311 B1 | 10/2003 | Douvikas et al. | |
| 6,640,307 B2 | 10/2003 | Viets et al. | |
| 6,646,515 B2 | 11/2003 | Jun et al. | |
| 6,647,388 B2 | 11/2003 | Numao et al. | |
| 6,678,835 B1 | 1/2004 | Shah et al. | |
| 6,687,822 B1 | 2/2004 | Jakobsson | |
| 6,711,683 B1 | 3/2004 | Laczko et al. | |
| 6,718,361 B1 | 4/2004 | Basani et al. | |
| 6,735,701 B1 | 5/2004 | Jacobson | |
| 6,738,908 B1 | 5/2004 | Bonn et al. | |
| 6,775,779 B1 | 8/2004 | England et al. | |
| 6,782,403 B1 | 8/2004 | Kino et al. | |
| 6,801,999 B1 | 10/2004 | Venkatesan et al. | |
| 6,807,534 B1 | 10/2004 | Erickson | |
| 6,807,636 B2 | 10/2004 | Hartman et al. | |
| 6,810,389 B1 | 10/2004 | Meyer | |
| 6,810,479 B1 | 10/2004 | Barlow et al. | |
| 6,816,871 B2 | 11/2004 | Lee | |
| 6,826,698 B1 | 11/2004 | Minkin et al. | |
| 6,834,333 B2 | 12/2004 | Yoshino et al. | |
| 6,834,341 B1 | 12/2004 | Bahl et al. | |
| 6,845,452 B1 | 1/2005 | Roddy et al. | |
| 6,851,050 B2 | 2/2005 | Singhal et al. | |
| 6,865,555 B2 | 3/2005 | Novak | |
| 6,874,139 B2 | 3/2005 | Krueger et al. | |
| 6,877,136 B2 | 4/2005 | Bess et al. | |
| 6,889,210 B1 | 5/2005 | Vainstein | |
| 6,891,953 B1 | 5/2005 | DeMello et al. | |
| 6,892,201 B2 | 5/2005 | Brown et al. | |
| 6,892,306 B1 | 5/2005 | En-Seung et al. | |
| 6,907,034 B1 | 6/2005 | Begis | |
| 6,909,708 B1 | 6/2005 | Krishnaswamy et al. | |
| 6,915,434 B1 | 7/2005 | Kuroda et al. | |
| 6,920,558 B2 | 7/2005 | Sames et al. | |
| 6,931,450 B2 | 8/2005 | Howard et al. | |
| 6,931,530 B2 | 8/2005 | Pham et al. | |
| 6,931,597 B1 | 8/2005 | Prakash | |
| 6,938,042 B2 | 8/2005 | Aboulhosn et al. | |
| 6,941,355 B1 | 9/2005 | Donaghey et al. | |
| 6,941,456 B2 | 9/2005 | Wilson | |
| 6,941,472 B2 | 9/2005 | Moriconi et al. | |
| 6,944,183 B1 | 9/2005 | Iyer et al. | |
| 6,947,556 B1 | 9/2005 | Matyas, Jr. et al. | |
| 6,950,818 B2 | 9/2005 | Dennis et al. | |
| 6,950,936 B2 | 9/2005 | Subramaniam et al. | |
| 6,950,941 B1 | 9/2005 | Lee et al. | |
| 6,950,943 B1 | 9/2005 | Bacha et al. | |
| 6,952,780 B2 | 10/2005 | Olsen et al. | |
| 6,957,261 B2 | 10/2005 | Lortz | |
| 6,959,308 B2 | 10/2005 | Gramsamer et al. | |
| 6,961,849 B1 | 11/2005 | Davis et al. | |
| 6,968,060 B1 | 11/2005 | Pinkas | |
| 6,971,018 B1 | 11/2005 | Witt et al. | |
| 6,978,376 B2 | 12/2005 | Giroux et al. | |
| 6,978,377 B1 | 12/2005 | Asano et al. | |
| 6,988,133 B1 | 1/2006 | Zavalkovsky et al. | |
| 6,988,199 B2 | 1/2006 | Toh et al. | |
| 6,993,135 B2 | 1/2006 | Ishibashi | |
| 6,996,718 B1 | 2/2006 | Henry et al. | |
| 7,003,117 B2 | 2/2006 | Kacker et al. | |
| 7,003,560 B1 | 2/2006 | Mullen et al. | |
| 7,003,661 B2 | 2/2006 | Beattie et al. | |
| 7,013,332 B2 | 3/2006 | Friedel et al. | |
| 7,013,485 B2 | 3/2006 | Brown et al. | |
| 7,020,645 B2 | 3/2006 | Bisbee et al. | |
| 7,024,427 B2 | 4/2006 | Bobbitt et al. | |
| 7,035,854 B2 | 4/2006 | Hsiao et al. | |
| 7,035,910 B1 | 4/2006 | Dutta et al. | |
| 7,046,807 B2 | 5/2006 | Hirano et al. | |
| 7,051,213 B1 | 5/2006 | Kobayashi et al. | |
| 7,058,696 B1 | 6/2006 | Phillips et al. | |
| 7,058,978 B2 | 6/2006 | Feuerstein et al. | |
| 7,073,063 B2 | 7/2006 | Peinado | |
| 7,073,073 B1 | 7/2006 | Nonaka et al. | |
| 7,076,067 B2 | 7/2006 | Raike et al. | |
| 7,076,312 B2 | 7/2006 | Law et al. | |
| 7,076,469 B2 | 7/2006 | Schreiber et al. | |
| 7,076,633 B2 | 7/2006 | Tormasov et al. | |
| 7,080,077 B2 | 7/2006 | Ramamurthy et al. | |
| 7,095,853 B2 | 8/2006 | Morishita | |
| 7,096,266 B2 | 8/2006 | Lewin et al. | |
| 7,099,926 B1 | 8/2006 | Ims et al. | |
| 7,107,269 B2 | 9/2006 | Arlein et al. | |
| 7,107,416 B2 | 9/2006 | Stuart et al. | |
| 7,117,322 B2 | 10/2006 | Hochberg et al. | |
| 7,120,635 B2 | 10/2006 | Bhide et al. | |
| 7,120,757 B2 | 10/2006 | Tsuge | |
| 7,124,164 B1 | 10/2006 | Chemtob | |
| 7,130,964 B2 | 10/2006 | Ims et al. | |
| 7,131,071 B2 | 10/2006 | Gune et al. | |
| 7,134,041 B2 | 11/2006 | Murray et al. | |
| 7,136,903 B1 | 11/2006 | Phillips et al. | |
| 7,145,898 B1 | 12/2006 | Elliott | |
| 7,146,388 B2 | 12/2006 | Stakutis et al. | |
| 7,146,498 B1 | 12/2006 | Takechi et al. | |
| 7,159,036 B2 | 1/2007 | Hinchliffe et al. | |
| 7,171,557 B2 | 1/2007 | Kallahalla et al. | |
| 7,174,563 B1 | 2/2007 | Brownlie et al. | |
| 7,177,427 B1 | 2/2007 | Komuro et al. | |
| 7,178,033 B1 | 2/2007 | Garcia | |
| 7,181,017 B1 | 2/2007 | Nagel et al. | |
| 7,185,364 B2 | 2/2007 | Knouse et al. | |
| 7,187,033 B2 | 3/2007 | Pendharkar | |
| 7,188,181 B1 | 3/2007 | Squier et al. | |
| 7,194,764 B2 | 3/2007 | Martherus et al. | |
| 7,200,747 B2 | 4/2007 | Riedel et al. | |
| 7,203,317 B2 | 4/2007 | Kallahalla et al. | |
| 7,203,968 B2 | 4/2007 | Asano et al. | |
| 7,219,230 B2 | 5/2007 | Riedel et al. | |
| 7,224,795 B2 | 5/2007 | Takada et al. | |
| 7,225,256 B2 | 5/2007 | Villavicencio | |
| 7,227,953 B2 | 6/2007 | Shida | |
| 7,233,948 B1 | 6/2007 | Shamoon et al. | |
| 7,237,002 B1 | 6/2007 | Estrada et al. | |
| 7,249,044 B2 | 7/2007 | Kumar et al. | |
| 7,260,555 B2 | 8/2007 | Rossmann et al. | |
| 7,265,764 B2 | 9/2007 | Alben et al. | |
| 7,266,684 B2 | 9/2007 | Jancula | |
| 7,280,658 B2 | 10/2007 | Amini et al. | |
| 7,287,055 B2 | 10/2007 | Smith et al. | |
| 7,290,148 B2 | 10/2007 | Tozawa et al. | |
| 7,308,702 B1 | 12/2007 | Thomsen et al. | |
| 7,313,824 B1 | 12/2007 | Bala et al. | |
| 7,319,752 B2 | 1/2008 | Asano et al. | |
| 7,340,600 B1 | 3/2008 | Corella | |
| 7,380,120 B1 | 5/2008 | Garcia | |
| 7,383,586 B2 | 6/2008 | Cross et al. | |
| 7,386,529 B2 | 6/2008 | Kiessig et al. | |

| | | | | | | |
|---|---|---|---|---|---|---|
| 2001/0011254 A1 | 8/2001 | Clark | | 2003/0182579 A1 | 9/2003 | Leporini et al. |
| 2001/0021926 A1 | 9/2001 | Schnek et al. | | 2003/0196096 A1* | 10/2003 | Sutton ........................ 713/181 |
| 2001/0032181 A1 | 10/2001 | Jakstadt et al. | | 2003/0197729 A1 | 10/2003 | Denoue et al. |
| 2001/0034839 A1 | 10/2001 | Karjoth et al. | | 2003/0200202 A1 | 10/2003 | Hsiao et al. |
| 2001/0044903 A1 | 11/2001 | Yamamoto et al. | | 2003/0217264 A1 | 11/2003 | Martin et al. |
| 2001/0056550 A1 | 12/2001 | Lee | | 2003/0217281 A1 | 11/2003 | Ryan |
| 2002/0010679 A1 | 1/2002 | Felsher | | 2003/0217333 A1 | 11/2003 | Smith et al. |
| 2002/0016922 A1 | 2/2002 | Richards et al. | | 2003/0226013 A1 | 12/2003 | Dutertre |
| 2002/0031230 A1 | 3/2002 | Sweet et al. | | 2003/0233650 A1 | 12/2003 | Zaner et al. |
| 2002/0035624 A1 | 3/2002 | Kim | | 2004/0022390 A1 | 2/2004 | McDonald et al. |
| 2002/0046350 A1 | 4/2002 | Lordemann et al. | | 2004/0025037 A1 | 2/2004 | Hair |
| 2002/0050098 A1 | 5/2002 | Chan | | 2004/0039781 A1 | 2/2004 | LaVallee et al. |
| 2002/0056042 A1 | 5/2002 | Van Der Kaay et al. | | 2004/0064710 A1 | 4/2004 | Vainstein |
| 2002/0062240 A1 | 5/2002 | Morinville | | 2004/0068524 A1 | 4/2004 | Aboulhosn et al. |
| 2002/0062245 A1 | 5/2002 | Niu et al. | | 2004/0068664 A1 | 4/2004 | Nachenberg et al. |
| 2002/0069077 A1 | 6/2002 | Brophy et al. | | 2004/0073660 A1 | 4/2004 | Toomey |
| 2002/0069272 A1 | 6/2002 | Kim et al. | | 2004/0073718 A1 | 4/2004 | Johannessen et al. |
| 2002/0069363 A1 | 6/2002 | Winburn | | 2004/0088548 A1 | 5/2004 | Smetters et al. |
| 2002/0073320 A1 | 6/2002 | Rinkevich et al. | | 2004/0098580 A1 | 5/2004 | DeTreville |
| 2002/0077986 A1 | 6/2002 | Kobata et al. | | 2004/0103202 A1 | 5/2004 | Hildebrand et al. |
| 2002/0077988 A1 | 6/2002 | Sasaki et al. | | 2004/0103280 A1 | 5/2004 | Balfanz et al. |
| 2002/0087479 A1 | 7/2002 | Malcolm | | 2004/0133544 A1 | 7/2004 | Kiessig et al. |
| 2002/0091928 A1* | 7/2002 | Bouchard et al. ........... 713/178 | | 2004/0158586 A1 | 8/2004 | Tsai |
| 2002/0099947 A1 | 7/2002 | Evans | | 2004/0193602 A1 | 9/2004 | Liu et al. |
| 2002/0124180 A1 | 9/2002 | Hagman | | 2004/0193905 A1 | 9/2004 | Lirov et al. |
| 2002/0129235 A1 | 9/2002 | Okamoto et al. | | 2004/0193912 A1 | 9/2004 | Li et al. |
| 2002/0133699 A1 | 9/2002 | Pueschel | | 2004/0199514 A1 | 10/2004 | Rosenblatt et al. |
| 2002/0138762 A1 | 9/2002 | Horne | | 2004/0215956 A1 | 10/2004 | Venkatachary et al. |
| 2002/0143710 A1 | 10/2002 | Liu | | 2004/0215962 A1 | 10/2004 | Douceur et al. |
| 2002/0143906 A1 | 10/2002 | Tormasov et al. | | 2004/0243853 A1 | 12/2004 | Swander et al. |
| 2002/0150239 A1* | 10/2002 | Carny et al. .................... 380/37 | | 2005/0021467 A1 | 1/2005 | Franzdonk |
| 2002/0156726 A1 | 10/2002 | Kleckner et al. | | 2005/0021629 A1 | 1/2005 | Cannata et al. |
| 2002/0157016 A1 | 10/2002 | Russell et al. | | 2005/0028006 A1 | 2/2005 | Leser et al. |
| 2002/0169963 A1 | 11/2002 | Seder et al. | | 2005/0039034 A1 | 2/2005 | Doyle et al. |
| 2002/0169965 A1 | 11/2002 | Hale et al. | | 2005/0071275 A1 | 3/2005 | Vainstein et al. |
| 2002/0172367 A1 | 11/2002 | Mulder et al. | | 2005/0071657 A1 | 3/2005 | Ryan |
| 2002/0174109 A1 | 11/2002 | Chandy et al. | | 2005/0071658 A1 | 3/2005 | Nath et al. |
| 2002/0176572 A1* | 11/2002 | Ananth ........................ 380/37 | | 2005/0081029 A1 | 4/2005 | Thornton et al. |
| 2002/0178271 A1 | 11/2002 | Graham et al. | | 2005/0086531 A1 | 4/2005 | Kenrich |
| 2002/0194484 A1 | 12/2002 | Bolosky et al. | | 2005/0091484 A1 | 4/2005 | Thornton et al. |
| 2002/0198798 A1 | 12/2002 | Ludwig et al. | | 2005/0120199 A1 | 6/2005 | Carter |
| 2003/0009685 A1 | 1/2003 | Choo et al. | | 2005/0138371 A1 | 6/2005 | Supramaniam |
| 2003/0014391 A1 | 1/2003 | Evans et al. | | 2005/0138383 A1 | 6/2005 | Vainstein |
| 2003/0023559 A1 | 1/2003 | Choi et al. | | 2005/0177716 A1 | 8/2005 | Ginter et al. |
| 2003/0028610 A1 | 2/2003 | Pearson | | 2005/0177858 A1* | 8/2005 | Ueda .......................... 725/105 |
| 2003/0033528 A1 | 2/2003 | Ozog et al. | | 2005/0198326 A1 | 9/2005 | Schlimmer et al. |
| 2003/0037133 A1 | 2/2003 | Owens | | 2005/0223242 A1 | 10/2005 | Nath |
| 2003/0037237 A1 | 2/2003 | Abgrall et al. | | 2005/0223414 A1 | 10/2005 | Kenrich et al. |
| 2003/0037253 A1 | 2/2003 | Blank et al. | | 2005/0235154 A1 | 10/2005 | Serret-Avila |
| 2003/0046238 A1 | 3/2003 | Nonaka et al. | | 2005/0256909 A1 | 11/2005 | Aboulhosn et al. |
| 2003/0051039 A1 | 3/2003 | Brown et al. | | 2005/0273600 A1 | 12/2005 | Seeman |
| 2003/0056139 A1 | 3/2003 | Murray et al. | | 2005/0283610 A1* | 12/2005 | Serret-Avila et al. ........ 713/176 |
| 2003/0074580 A1 | 4/2003 | Knouse et al. | | 2005/0288961 A1 | 12/2005 | Tabrizi |
| 2003/0078959 A1 | 4/2003 | Yeung et al. | | 2006/0005021 A1 | 1/2006 | Torrubia-Saez |
| 2003/0079175 A1 | 4/2003 | Limantsev | | 2006/0075465 A1 | 4/2006 | Ramanathan et al. |
| 2003/0081784 A1 | 5/2003 | Kallahalla et al. | | 2006/0093150 A1 | 5/2006 | Reddy et al. |
| 2003/0081787 A1 | 5/2003 | Kallahalla et al. | | 2006/0168147 A1 | 7/2006 | Inoue et al. |
| 2003/0088517 A1 | 5/2003 | Medoff | | 2006/0230437 A1 | 10/2006 | Boyer et al. |
| 2003/0088783 A1 | 5/2003 | DiPierro | | 2007/0006214 A1 | 1/2007 | Dubal et al. |
| 2003/0101072 A1 | 5/2003 | Dick et al. | | 2007/0067837 A1 | 3/2007 | Schuster |
| 2003/0110169 A1 | 6/2003 | Zuili | | | | |
| 2003/0110266 A1 | 6/2003 | Rollins et al. | | | FOREIGN PATENT DOCUMENTS | |
| 2003/0110397 A1 | 6/2003 | Supramaniam | | | | |
| 2003/0115146 A1 | 6/2003 | Lee et al. | | EP | 0 674 253 A1 | 9/1995 |
| 2003/0115570 A1 | 6/2003 | Bisceglia | | EP | 0 809 170 A1 | 11/1997 |
| 2003/0120601 A1 | 6/2003 | Ouye | | EP | 0 913 966 A2 | 5/1999 |
| 2003/0120684 A1 | 6/2003 | Zuili et al. | | EP | 0 913 967 A2 | 5/1999 |
| 2003/0126434 A1 | 7/2003 | Lim et al. | | EP | 0 950 941 A2 | 10/1999 |
| 2003/0154381 A1 | 8/2003 | Ouye | | EP | 0 950 941 A3 | 10/1999 |
| 2003/0159066 A1 | 8/2003 | Staw et al. | | EP | 1 107 504 B1 | 6/2001 |
| 2003/0172280 A1 | 9/2003 | Scheidt et al. | | EP | 1 107504 A2 | 6/2001 |
| 2003/0177070 A1 | 9/2003 | Viswanath et al. | | EP | 1 130 492 A2 | 9/2001 |
| 2003/0177378 A1 | 9/2003 | Wittkotter | | EP | 1 154 348 A2 | 11/2001 |

| | | | |
|---|---|---|---|
| EP | 1324565 A1 | 7/2003 |
| GB | 2 328 047 A | 2/1999 |
| JP | 2001-036517 | 2/2001 |
| WO | WO 96/41288 A1 | 12/1996 |
| WO | WO 00/56028 A2 | 9/2000 |
| WO | WO 01/61438 A2 | 8/2001 |
| WO | WO 01/63387 A2 | 8/2001 |
| WO | WO 01/63387 A3 | 8/2001 |
| WO | WO 01/77783 A2 | 10/2001 |
| WO | WO 01/78285 A1 | 10/2001 |
| WO | WO 01/84271 A2 | 11/2001 |

OTHER PUBLICATIONS

McDaniel et al. "Antigone: A Flexible Framework for Secure Group Communication," Proceedings of the 8th USENIX Security Symposium, Aug. 23, 1999.

Stallings, William, "Cryptography and Network Security: Principles and Practice," 1999, pp. 333-337, Second Edition, Prentice Hall, Upper Saddle River, New Jersey.

"Affect," The American Heritage Dictionary of the English Language, Fourth Edition, Houghton Mifflin Company, 2002. Retrieved May 4, 2006 from http://dictionary.reference.com/search?q=affect.

"Inside Encryping file system," Part 1, from MSDN Oct. 2001 version, exact publication date is unknown but believed prior to Dec. 12, 2001.

"Inside Encryping file system," Part 2, from MSDN Oct. 2001 version, exact publication date is unknown but believed prior to Dec. 12, 2001.

"Security with Encryping File System," from MSDN Oct. 2001 version, exact publication date is unknown but believed prior to Dec. 12, 2001.

"How EFS work," from MSDN Oct. 2001 version, exact publication date is unknown but believed prior to Dec. 12, 2001.

"Encryping File System," from MSDN Oct. 2001 version, exact publication date is unknown but believed prior to Dec. 12, 2001.

"Features of EFS" from MSDN Oct. 2001 version, exact publication date is unknown but believed prior to Dec. 12, 2001.

"Windows 2000 EFS" in the Apr. 1999 issue of Windows NT magazine.

Microsoft Windows 200 server. Windows 2000 Group Policy White Paper, 2000.

Symantec. Norton Antivirus Corporate Edition Implementation Guide, 1999.

Crocker, Steven Toye, "Multi-level cryptographic transformations for securing digital assets," U.S. Appl. No. 10/404,566, filed Mar. 31, 2003.

Crocker, Steven Toye, "Effectuating access policy changes to designated places for secured files," U.S. Appl. No. 10/259,075, filed Sep. 27, 2002.

Kenrich, Michael Frederick, "Multi-Level File Digest", U.S. Appl. No. 10/894,493, filed Jul. 19, 2004.

Kinghorn, Gary Mark, "Method and system for protecting electronic data in enterprise environment," U.S. Appl. No. 10/159,220, filed May 31, 2002.

Nath, Satyajit, "Method and system for securing digital assets using content type designations," U.S. Appl. No. 10/405,587, filed Apr. 1, 2003.

Prakash, Nalini J., "Method and apparatus for securing/unsecuring files by file crawling," U.S. Appl. No. 10/325,102, filed Dec. 20, 2002.

Rossmann, Alain, "Hybrid systems for securing digital assets," U.S. Appl. No. 10/325,013, filed Dec. 20, 2002.

A Real-Time Push-Pull Communications Model for Distributed Real-Time and Multimedia Systems, Jan. 1999, School of Computer Sciences Carnegie Mellon University, Kanaka Juvva, Raj Rajkumar.

U.S. Appl. No. 10/889,685, entitled "Method and Apparatus for Controlling the Speed Ranges of a Machine" inventor Thomas, filed Jul. 13, 2004, 18 pgs.

U.S. Appl. No. 10/028,397, entitled "Method and system for restricting use of a clipboard application," inventor Zuili, filed Dec. 21, 2001, 38 pgs.

U.S. Appl. No. 10/368,277, entitled "Method and apparatus for uniquely identifying files," inventor Ouye, filed Feb. 18, 2003, 25 pgs.

U.S. Appl. No. 10/327,320, entitled "Security system with staging capabilities" inventor Vainstein, filed Dec. 20, 2002, 39 pgs.

U.S. Appl. No. 10/286,524, entitled "Security system that uses indirect password-based encryption," inventor Gutnik, filed Nov. 1, 2002, 38 pgs.

U.S. Appl. No. 10/242,185, entitled "Method and system for protecting encrypted files transmitted over a network" inventor Ryan, filed Sep. 11, 2002, 33 pgs.

U.S. Appl. No. 10/642,041, entitled "Method and system for fault-tolerant transfer of files across a network" inventor Kenrich, filed Aug. 15, 2003, 32 pgs.

U.S. Appl. No. 10/610,832, entitled "Method and system for enabling users of a group shared across multiple file security systems to access secured files" inventor Ryan, filed Jun. 30, 2003, 33 pgs.

U.S. Appl. No. 10/448,806, entitled "Method and System for Using Remote Headers to Secure Electronic Files" inventor Ryan, filed May 30, 2003, 35 pgs.

U.S. Appl. No. 10/074,194, entitled "Methods for idnetifying compunds that inhibit or reduce PTP1B expressions" inventor Rondinone, filed Feb. 12, 2002, 69 pgs.

U.S. Appl. No. 10/074,804, entitled "Secured Data Format for Access Control," inventor Garcia, filed Feb. 12, 2002, 108 pgs.

U.S. Appl. No. 10/075,194, entitled "System and Method for Providing Multi-location Access Management to Secured Items," inventor Vainstein et al., filed Feb. 12, 2002, 110 pgs.

U.S. Appl. No. 10/074,996, entitled "Method and Apparatus for Securing Electronic Data," inventor Lee et al., filed Feb. 12, 2002, 111 pgs.

U.S. Appl. No. 10/074,825, entitled "Method and Apparatus for Accessing Secured Electronic Data Off-line," inventor Lee et al., filed Feb. 12, 2002, 108 pgs.

U.S. Appl. No. 10/105,532, entitled "System and Method for Providing Different Levels of Key Security for Controlling Access to Secured Items," inventor Hildebrand et al., filed Mar. 20, 2002, 86 pgs.

U.S. Appl. No. 10/186,203, entitled "Method and System for Implementing Changes to Security Policies in a Distributed Security System," inventor Huang, filed Jun. 26, 2002, 65 pgs.

U.S. Appl. No. 10/201,756, entitled "Managing Secured Files in Designated Locations," inventor Alain, filed Jul. 22, 2002, 121 pgs.

U.S. Appl. No. 10/206,737, entitled "Method and System for Updating Keys in a Distributed Security System," inventor Hildebrand, filed Jul. 26, 2002, 60 pgs.

U.S. Appl. No. 10/246,079, entitled "Security System for Generating Keys from Access rules in a Decentralized Manner and Methods Therefor," inventor Hildebrand, filed Sep. 17, 2002, 78 pgs.

U.S. Appl. No. 10/259,075, entitled "Effectuating Access Policy Changes to Designated Places for Secured Files," inventor Crocker, filed Sep. 27, 2002, 60 pgs.

U.S. Appl. No. 10/286,575, entitled "Method and Architecture for Providing Access to Secured Data from Non-Secured Clients," inventor Vainstein, filed Nov. 1, 2002, 46 pgs.

U.S. Appl. No. 10/295,363, entitled "Security System Using Indirect Key Generation from Access Rules and Methods Therefor," inventor Vainstein, filed Nov. 15, 2002, 70 pgs.

U.S. Appl. No. 11/889,310, entitled "Methods and Systems for Providing Access Control to Electronic Data," inventor Rossmann, filed Aug. 10, 2007, 90 pgs.

U.S. Appl. No. 11/797,367, entitled "Method and System for Managing Security Tiers," inventor Vainstein, filed May 2, 2007, 11 pgs.

Adobe Acrobat 5.0 Classroom in a Book, Adobe Press, Jun. 26, 2001, pp. 1-4.

Adobe Acrobat Security Settings, Acrobat 7.0, Nov. 15, 2004, pp. 1-4.

"Security Options". Dec. 20, 2001. DC & Co. pp. 1-2.

Microsoft Press Computer Dictionary, 1997, Microsoft Press, Third Edition, p. 426.

Search Report, completion date May 8, 2003, for European Patent Application No. EP 02 25 8530, 2 pages.

Search Report, completion date Oct. 2, 2003, for European Patent Application No. EP 02 25 8531, 2 pages.

Search Report, completion date Apr. 14, 2005, for European Patent Application No. EP 02 25 8533, 2 pages.
Search Report, completion date Mar. 16, 2005, for European Patent Application No. EP 02 25 8534, 2 pages.
Search Report, completion date Mar. 2, 2005, for European Patent Application No. EP 02 25 8535, 2 pages.
Search Report, completion date Mar. 3, 2005, for European Patent Application No. EP 02 25 8537, 2 pages.
Search Report, completion date May 12, 2005, for European Patent Application No. EP 02 25 8539, 2 pages.
Search Report, completion date Jul. 6, 2005, for European Patent Application No. EP 02 25 8529, 4 pages.
Search Report, completion date Oct. 8, 2003, for European Patent Application No. EP 02 25 8536, 2 pages.
Search Report, completion date May 8, 2003, for European Patent Application No. EP 02 25 8540, 2 pages.
Examination Report, completion date Jun. 18, 2008, for European Patent Application No. EP 02 258 532.7-1244, 6 pgs.
Boneh et al., "Hierarchical Identity Based Encryption with Constant Size Ciphertext," Advances in Cryptology-EUROCRYPT 2005, vol. 3493, Jun. 20, 2005, pp. 440-456.
Boneh et al., "IBE Secure E-mail," Stanford University, Apr. 8, 2002, http://crypto.stanford.edu/ibe/.

* cited by examiner

MULTI-LEVEL FILE DIGESTS

CROSS-REFERENCE TO RELATED APPLICATIONS

This application is related to: (i) U.S. patent application Ser. No. 10/815,251, filed Mar. 30, 2004, now allowed, and entitled "METHOD AND SYSTEM FOR PROVIDING DOCUMENT RETENTION USING CRYPTOGRAPHY," which is hereby incorporated herein by reference; (ii) U.S. patent application Ser. No. 10/186,203, filed Jun. 26, 2002, and entitled "METHOD AND SYSTEM FOR IMPLEMENTING CHANGES TO SECURITY POLICIES IN A DISTRIBUTED SECURITY SYSTEM," which is hereby incorporated herein by reference; (iii) U.S. patent application Ser. No. 10/159,537, filed May 5, 2002, now U.S. Pat. No. 7,178,033 that issued Feb. 13, 2007, and entitled "METHOD AND APPARATUS FOR SECURING DIGITAL ASSETS," which is hereby incorporated herein by reference; and (iv) U.S. patent application Ser. No. 10/127,109, filed Apr. 22, 2002, and entitled "DYNAMIC EVALUATION OF ACCESS RIGHTS," which is hereby incorporated herein by reference.

BACKGROUND OF THE INVENTION

1. Field of the Invention

The present invention relates to digests for electronic files and, more particularly, to use of digests in file management systems.

2. Description of Related Art

File management systems can make use of hash or digest values when managing electronic files. The management of electronic files can vary depending on the application. For example, the management may provide document retention for electronic files. As another example, the management may provide file security to restrict access to electronic files.

Hash or digest values are often used to identify electronic files or as a representation (e.g., signature) of their contents. Hash or digest values are also often used to identify or authenticate files. Unfortunately, whenever an electronic file is changed the hash or digest values must again be determined. Computation of hash or digest values can be burdensome when the electronic documents are changed because the computations must be repeated each time. In the case of encrypted documents, the overhead associated with providing hash or digest values can be particularly burdensome. For example, it is inefficient to have to decrypt an entire encrypted file and then subsequently produce the hash or digest values as well as again encrypt the electronic file when only a part of the electronic file has been modified.

Therefore, there is a need for improved approaches to produce hash or digest values for electronic documents.

SUMMARY OF THE INVENTION

The invention relates to inventive approaches to efficiently produce a digest (digest value) for an electronic file. According to the invention, a digest is arranged to have multiple levels, i.e., a hierarchy. The hierarchy has a top level and at least one lower level. The digest at the top level can be referred to as a super digest, and the digests at the at least one lower level can be referred to as block digests or intermediate digests. The top level digest represents a single digest for the associated electronic file. The lower level digests represent digests for portions of the associated electronic file. The top level digest is derived from the lower level digests. The top level digest is useful for facilitating rapid comparison to determine whether electronic files are the same.

In one embodiment, electronic files are encrypted with a block encryption scheme. Block encryption schemes are advantageous because they permit encryption of an electronic file on a block-by-block basis so that individual blocks can be selectively read or written without decrypting or encrypting the entire electronic file. Additionally, block encryption can provide greater security for an electronic file because the entire electronic file is typically not ever completely in the clear. Hence, according to one embodiment of the invention, digests are calculated and stored on a block-by-block basis. Advantageously, when modifications to an encrypted electronic file occur, only those modified blocks need to be processed to undergo decryption and re-encryption to determine the appropriate digest. Hence, the overhead associated with the re-calculation of the digest following a modification to the electronic file can be reduced according to one embodiment of the invention. The invention is thus particularly advantageous for electronic files that utilize block encryption. Two encrypted electronic files, or one encrypted file and one non-encrypted file, can be efficiently compared using the top level digests without having to perform any decryption.

The invention can be implemented in numerous ways, including as a method, system, device, and computer readable medium. Several embodiments of the invention are discussed below.

As a method for forming an encrypted electronic file, one embodiment of the invention includes at least the acts of: identifying an electronic file to be encrypted; obtaining a block of data from the identified electronic file; computing a block digest for the block of data; encrypting the block of data; storing the encrypted block and the block digest to an encrypted electronic file; repeating the obtaining, the computing, the encrypting and the storing acts for at least another block of data from the identified electronic file; computing a super digest for the identified electronic file; and storing the super digest to the encrypted data file.

As a method for storing a modification to an encrypted electronic file having encrypted blocks of data, block digests and a super digest, one embodiment of the invention includes at least the acts of: providing a modified block of data of the encrypted electronic file, the modified block of data being unencrypted; computing a block digest for the modified block of data; encrypting the modified block of data; storing the encrypted block and the block digest to the encrypted electronic file; computing a super digest for the electronic file; and storing the super digest to the encrypted data file.

As a method for comparing electronic files, one embodiment of the invention includes at least the acts of: obtaining a first super digest for a first file, the first super digest being previously determined from a plurality of digests corresponding to portions of the first file; obtaining a second super digest for a second file, the second super digest being previously determined from a plurality of digests corresponding to portions of the second file; comparing the first super digest with the second super digest; and concluding that the first file is the same as the second file if the comparing indicates that the first super digest is the same as the second super digest.

As a computer readable medium including at least computer program code for forming an encrypted electronic file, one embodiment of the invention includes at least: computer program code for identifying an electronic file to be encrypted; computer program code for obtaining blocks of data from the identified electronic file; computer program code for computing a block digest for each of the blocks of data; computer program code for encrypting the blocks of data; computer program code for storing the encrypted blocks and the block digests to an encrypted electronic file; computer program code for computing a top level digest of a multi-level digest for the electronic file; and computer program code for storing the top level digest to the encrypted data file.

Other objects, features, and advantages of the present invention will become apparent upon examining the following detailed description of an embodiment thereof, taken in conjunction with the attached drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to inventive approaches to efficiently produce a digest (digest value) for an electronic file. According to the invention, a digest is arranged to have multiple levels, i.e., a hierarchy. The hierarchy has a top level and at least one lower level. The digest at the top level can be referred to as a super digest, and the digests at the at least one lower level can be referred to as block digests or intermediate digests. The top level digest represents a single digest for the associated electronic file. The lower level digests represent digests for portions of the associated electronic file. The top level digest is derived from the lower level digests. The top level digest is useful for facilitating rapid comparison to determine whether electronic files are the same.

In one embodiment, electronic files are encrypted with a block encryption scheme. Block encryption schemes are advantageous because they permit encryption of an electronic file on a block-by-block basis so that individual blocks can be selectively read or written without decrypting or encrypting the entire electronic file. Additionally, block encryption can provide greater security for an electronic file because the entire electronic file is typically not ever completely in the clear. Hence, according to one embodiment of the invention, digests are calculated and stored on a block-by-block basis. Advantageously, when modifications to an encrypted electronic file occur, only those modified blocks need to be processed to undergo decryption and re-encryption to determine the appropriate digest. Hence, the overhead associated with the re-calculation of the digest following a modification to the electronic file can be reduced according to one embodiment of the invention. The invention is thus particularly advantageous for electronic files that utilize block encryption. Two encrypted electronic files, or one encrypted file and one non-encrypted file, can be efficiently compared using the top level digests without having to perform any decryption.

The invention is related to processes, systems, architectures and software products for providing hierarchical digests of digital assets (e.g., electronic files). The invention is particularly suitable in an enterprise environment. In one embodiment, the invention can be implemented by a security system that additionally secures digital assets (i.e., secured data) so that only authenticated users with appropriate access rights or privileges can gain access thereto. In another embodiment, the invention can be implemented by a file retention system that manages retention of digital assets in accordance with retention policies. Digital assets may include, but not be limited to, various types of electronic files, documents, data, executable code, images and text.

In the following description, numerous specific details are set forth in order to provide a thorough understanding of the invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order, nor imply any limitations in the invention.

Embodiments of the invention are discussed herein with reference to FIGS. 1-8. However, those skilled in the art will readily appreciate that the detailed description given herein with respect to these figures is for explanatory purposes as the invention extends beyond these limited embodiments.

Figure 1:
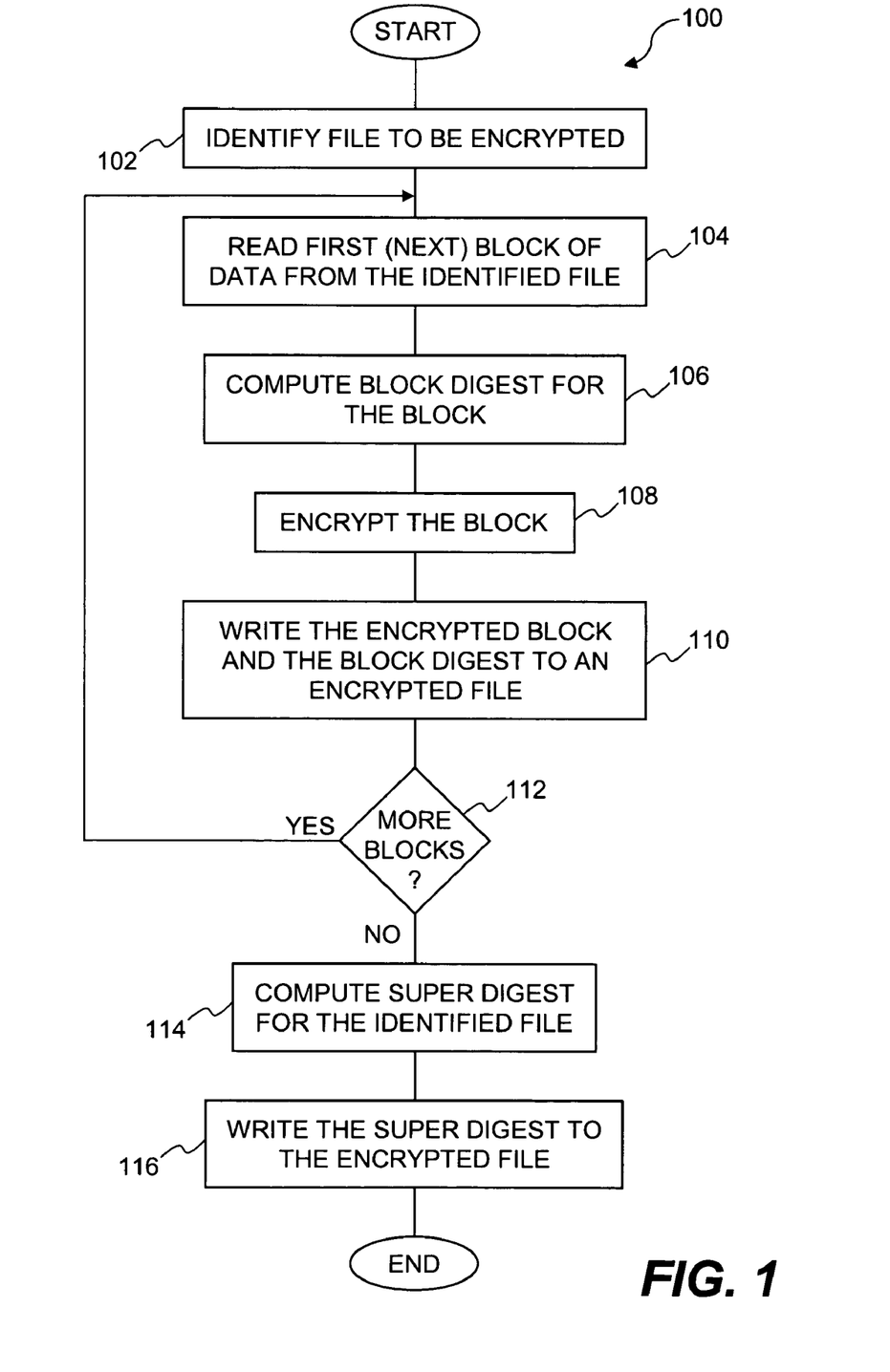
FIG. 1 is a flow diagram of a file encryption process according to one embodiment of the invention.

FIG. 1 is a flow diagram of a file encryption process 100 according to one embodiment of the invention. The file encryption process 100 can be part of a file management system. The file encryption process 100 initially identifies 102 a file to be encrypted. A first block of data is then read 104 from the identified file. Here, the identified file is processed a block at a time. A block digest is then computed 106 for the block. Digests are well known in the art. One example of a suitable digest is Message Digest 5 (MD5). MD5 is a popular algorithm that produces a 128-bit message digest from a data input (message). The resulting message digest is useful for verification of data integrity or for use with digital signature applications. Another example of a block digest is Secure Hash Algorithm (SHA-1).

Next, the block is encrypted 108. For example, a private key of a public-private key pair can be used to encrypt the block. At this point, the encrypted block and the block digest can be written 110 to an encrypted file. The encrypted file represents the resulting encrypted file that stores the content of the identified file in an encrypted format.

The file encryption process 100 operates on a block-by-block basis. Hence, following the operation 110, a decision 112 determines whether there are more blocks in the identified file that are to be processed. When the decision determines that there is at least one additional block to be processed, the file encryption process 100 returns to repeat the operation 104 so that a next block of data can be read from the identified file and then similarly processed. On the other hand, when the decision 112 determines that there are no more additional blocks of the identified file to be processed, a super digest for the identified file is computed 114. The super digest for the identified file represents a single digest value for the file. The super digest is computed 114 from a plurality of lower level digests as explained in more detail below. The super digest is unique for each different file. In other words, non-identical files will have different super digests, while identical files will have the same super digests.

After the super digest is computed 114, the super digest is written 116 to the encrypted file. Hence, the encrypted file includes not only the encrypted data from the identified file but also the super digest as well as the block digests for each of the blocks. Following the operation 116, the file encryption process 100 is complete and ends.

The digests can have a hierarchy such that there is a top level, or super digest, that represents a single digest for the associated electronic document. The super digest permits efficient comparison of two electronic documents to determine whether they are the same. In particular, two electronic documents with the same super digests are the same electronic document. The super digests can also be used to compare one encrypted file with a non-encrypted file to determine whether they are the same. The super digest can also act as an identifier for the electronic document.

Figure 2:
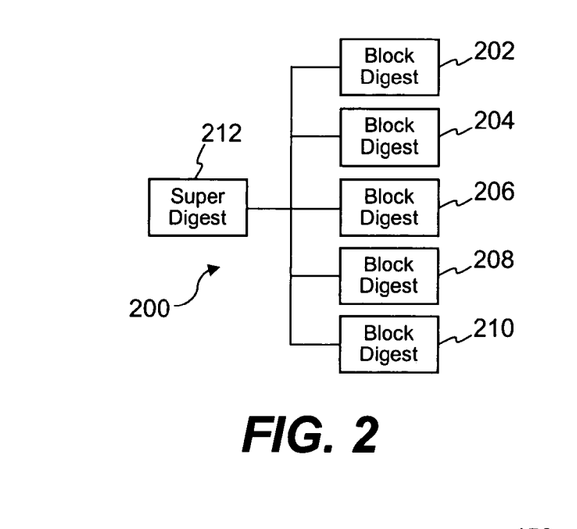
FIG. 2 is a diagram of a two-level file digest arrangement according to one embodiment of the invention.

FIG. 2 is a diagram of a two-level file digest arrangement 200 according to one embodiment of the invention. The two-level file digest arrangement 200 derives a super digest 212 directly from block digests 202-210. In this embodiment, the block digests 202-210 form the first level of digests, and the super digest 212 forms a top level digest.

Figure 3:
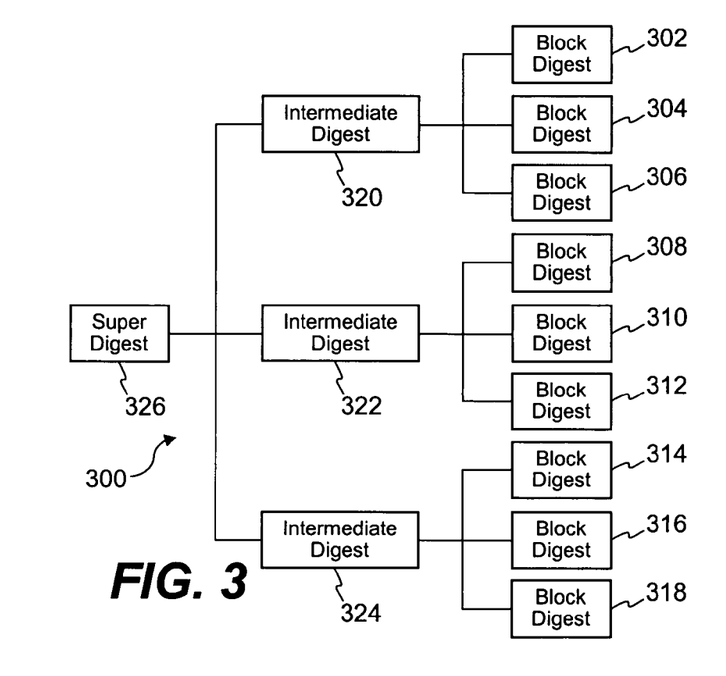
FIG. 3 is a diagram of a three-level file digest arrangement according to one embodiment of the invention.

FIG. 3 is a diagram of a three-level file digest arrangement 300 according to one embodiment of the invention. The three-level file digest arrangement 300 includes block digests 302-318, intermediate digests 320-324, and a super digest 326. In this embodiment, the block digests 302-318 form the first level of digests, the intermediate digests 320-324 form a second level digest, and the super digest 326 forms a top level digest. As shown in FIG. 3, the intermediate digest 320 is derived directly from the block digests 302-306; the intermediate digest 322 is derived directly from the block digests 308-312; and the intermediate digest 324 is derived directly from the block digests 314-318. Similarly, the super digest 326 is derived directly from the intermediate digests 320-324.

Figure 4A:
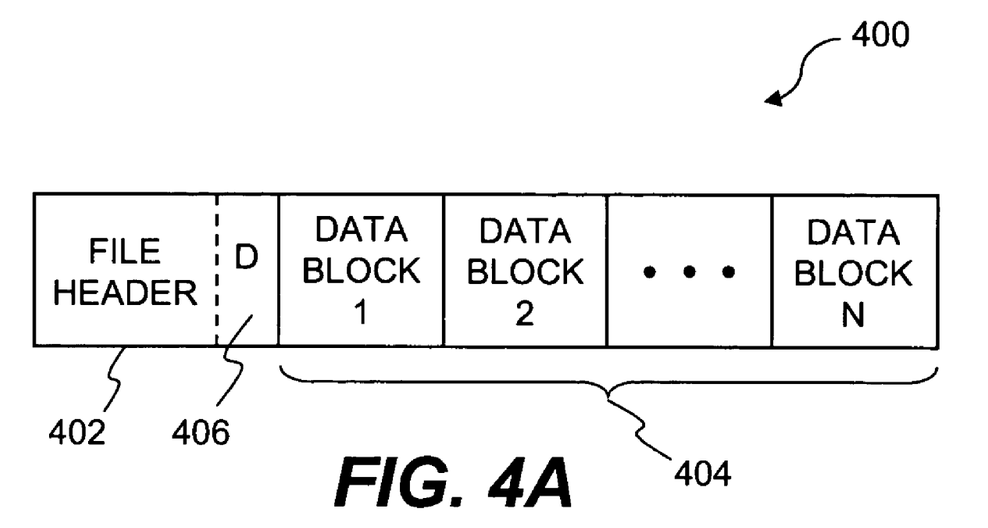
FIG. 4A is a diagram of a file format according to one embodiment of the invention.

FIG. 4A is a diagram of a file format 400 according to one embodiment of the invention. The file format 400 includes a file header 402 and a data portion 404. The data portion 404 includes N data blocks. The file header 402 includes file management information as is typical. For example, the file management information can include the number (N) of data blocks, the size of the file or data blocks, etc. In addition, the file header 402 includes a digest portion 406. The digest portion 406 includes not only a super digest but also block digests for each of the N data blocks.

In the embodiment shown in FIG. 4A, all of the digests, including the super digest and the block digests, are stored in the file header 402. However, as file size increases, the amount of digest data to be stored becomes larger. Hence, in other embodiments, some or all of the digest data can be distributed elsewhere in the file format.

Figure 4B:
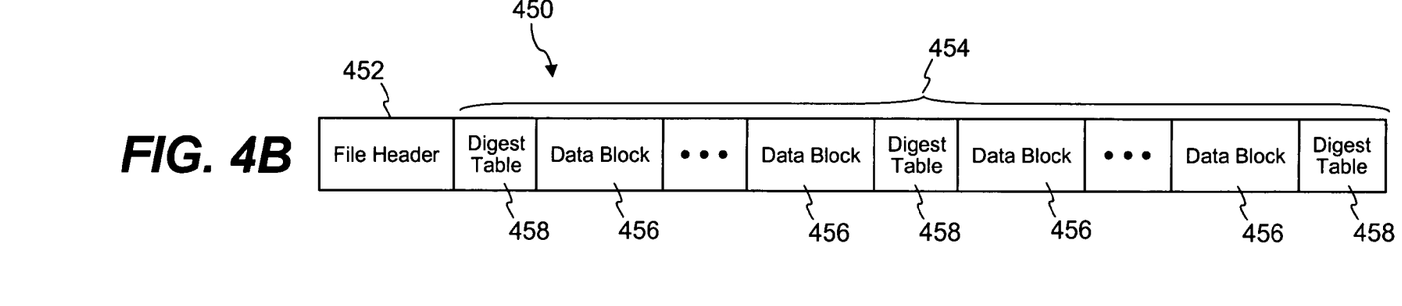
FIG. 4B is a diagram of a file format according to another embodiment of the invention.

FIG. 4B is a diagram of a file format 450 according to another embodiment of the invention. The file format 450 includes a file header 452 and a data portion 454. The file header 452 typically will store a super digest and possibly any intermediate digests being utilized. However, block digests corresponding to data blocks are stored in the data portion 454. More particularly, the data portion 454 stores a plurality of data blocks 456 and a plurality of digest table blocks 458. As an example, the digest table blocks 458 can be associated one to one with the data blocks 456. As another example, the digest table blocks 458 can, more generally, appear at regular intervals in the data portion 454.

Still further, electronic files using the file format 400 or 450 can be secured through use of encryption. In such case, the data blocks can be separately encrypted using a block encryption scheme. The electronic files, such as the file header 402 or 452, can further include security information. The security information is information used to unsecure the secure electronic files. For example, the security information might include an encryption key and/or an encryption policy for the electronic file.

In yet other embodiments, the digest data can be stored remotely from the file. For example, the file might not include some or all of the digest data and instead contain a reference or link to the digest data.

Figure 5:
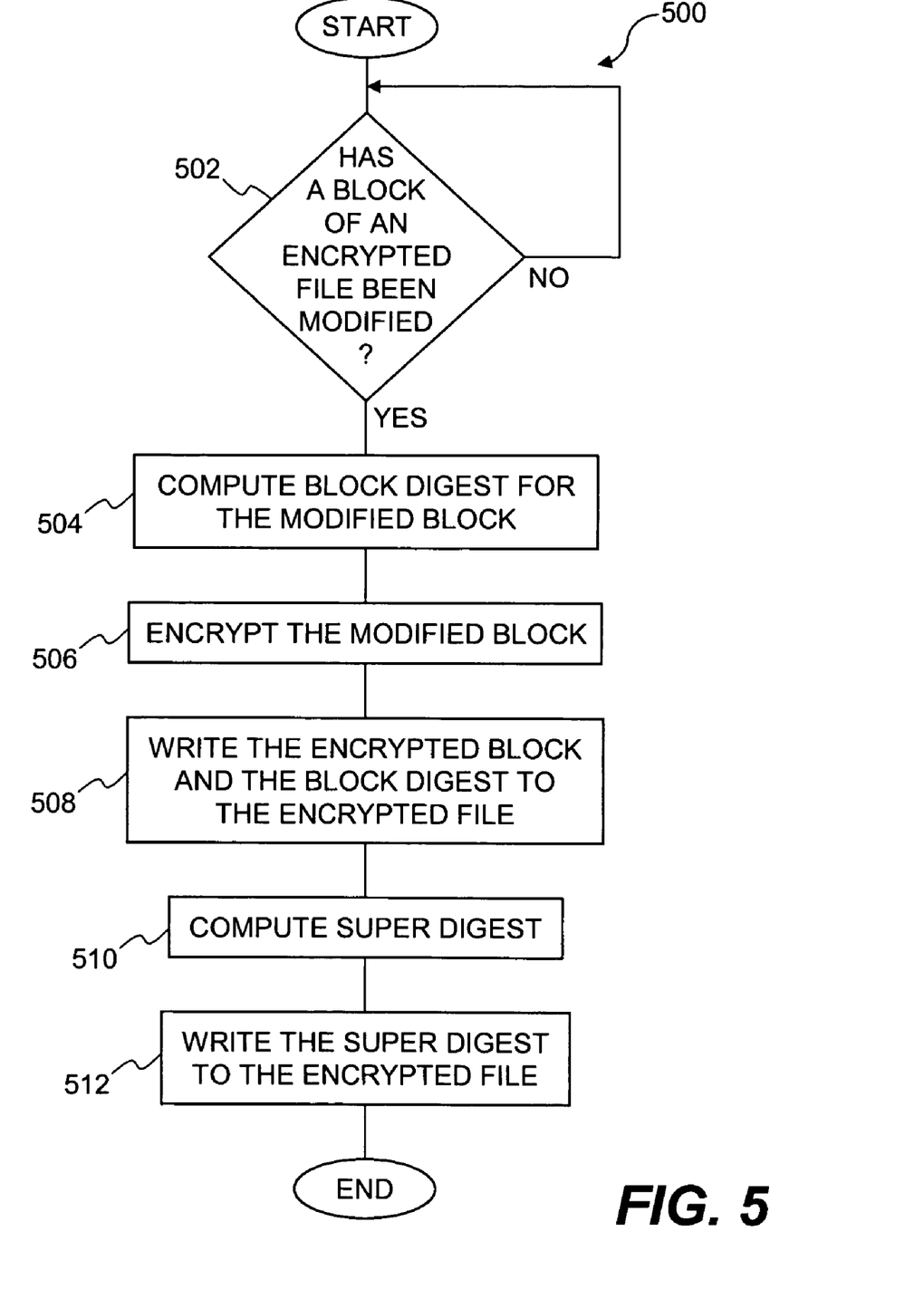
FIG. 5 is a flow diagram of an encrypted file modification process according to one embodiment of the invention.

FIG. 5 is a flow diagram of an encrypted file modification process 500 according to one embodiment of the invention. The encrypted file modification process 500 is a process that is utilized when an encrypted file, such as an encrypted file produced by the file encryption process 100 shown in FIG. 1, is subsequently modified. That is, when the data of the encrypted file is modified, one or more of the various digests utilized and stored in the encrypted file will also need to be modified.

The encrypted file modification process 500 begins with a decision 502 that determines whether a block of an encrypted file has been modified. Here, the modification is assumed to be to a single block of an encrypted file. However, it should be understood that the same process can be performed when multiple blocks of the encrypted file have been modified. However, if all of the blocks of the encrypted file have been modified, then the file encryption process 100 can instead be performed given that the entire file needs to be updated.

Once the decision 502 determines that a block of the encrypted file has been modified, a block digest for the modified block is computed 504. The modified block is not encrypted at this point. After the block digest for the modified block is computed 504, the modified block is encrypted 506. The encrypted modified block (encrypted block) and the block digest can then be written 508 to the encrypted file. It should be noted that, in some cases, the encrypted block after the modification is the same size as the encrypted block prior to the modification, such that subsequently stored blocks in the encrypted file are not affected. On the other hand, in the case in which the encrypted block following the modification is larger (or possibly smaller) than the encrypted block prior to the modification, subsequent blocks in the file format may be affected. When other blocks have been modified, the operations 504-508 can repeat for each of the other blocks that have been modified.

In any case, after the encrypted block and the block digest have been written 508, a super digest is computed 510. Here, since at least one block digest has been altered, the previous super digest is no longer useful. Hence, the super digest must be computed 510 any time at least one block has been modified. Thereafter, the super digest is written 512 to the encrypted file. Following the operation 512, the encrypted file modification process 500 is complete and ends.

Secured files are files that require one or more keys, passwords, access privileges, etc. to gain access to their content. The security is often provided through encryption and access rules. The files, for example, can pertain to documents, multimedia files, data, executable code, images and text. In general, a secured file can only be accessed by authenticated users with appropriate access rights or privileges. In one embodiment, each secured file is provided with a header portion and a data portion, where the header portion contains, or points to, security information. The security information is used to determine whether access to associated data portions of secured files is permitted.

As used herein, a user may mean a human user, a software agent, a group of users, a member of the group, a device and/or application. Besides a human user who needs to access a secured document, a software application or agent sometimes needs to access secured files in order to proceed. Accordingly, unless specifically stated, the "user" as used herein does not necessarily pertain to a human being.

Figure 6:
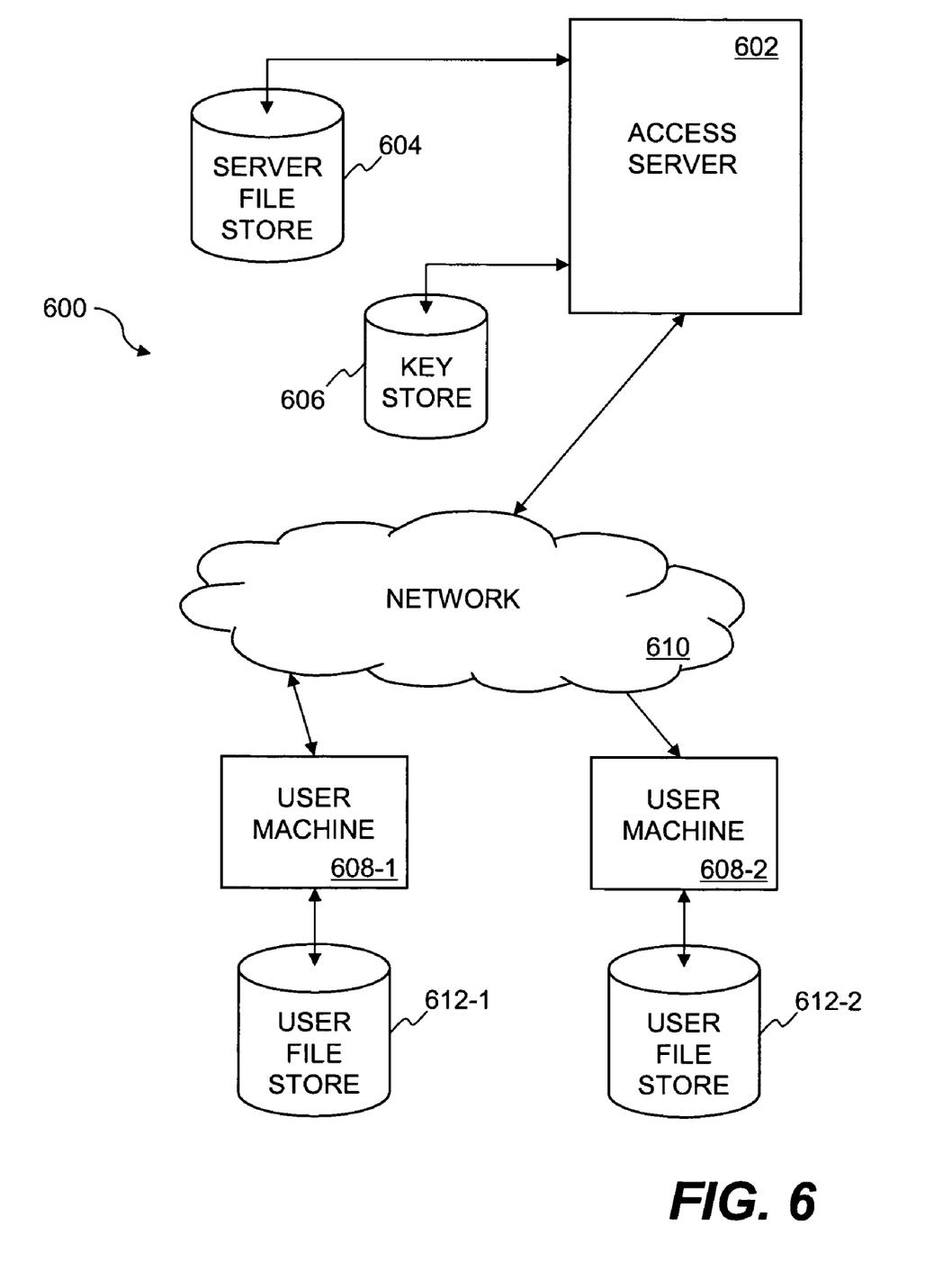
FIG. 6 is a block diagram of a file security system according to one embodiment of the invention.

FIG. 6 is a block diagram of a file security system 600 according to one embodiment of the invention. The file security system 600 includes an access server 602 that provides central management for the file security system 600. The access server 602 can store or retrieve files from a server file store 604. The access server 602 can control the distribution of cryptographic keys from a key store 606. In addition, the access server 602 can generate cryptographic keys that are stored to the key store 606. Alternatively, the access server 602 can store cryptographic keys in the key store 606 that have been received by the access server 602.

The file security system 600 also includes user machines 608 and user file stores 612. The user machines 608 couple to the access server 602 via a network 610. The network 610 can be a private network or a public network. The user machine 608 also has a user file store 612 coupled thereto. The user file store 612 can store electronic files locally for the user of the corresponding user machine 608. On the other hand, the server file store 604 can provide centralized, remote storage of electronic files for any of the users of the user machines 608.

The file security system 600 enables a user at the user machine 608 to secure an electronic file (document) such that access to the secured electronic file is restricted. In one embodiment of the invention, the access restriction is or includes a document retention restriction. As an example, the document retention restriction could permit subsequent access to the secured electronic file only during the retention period. After the retention period, the secured electronic file would be unable to be unsecured and thus subsequent access would be cryptographically prevented. In one embodiment, the retention period is specified or associated with a document retention policy that is assigned to the secured electronic file.

Once an electronic file has been secured, a user at a user machine can attempt to access the secured electronic file. In doing so, the user machine for the user would need to access the access server 602 and retrieve the appropriate one or more cryptographic keys from the key store 606 that are needed to unsecure the secured electronic file. Such requires that the user machine be connected to the network 610 (i.e., on-line). Alternatively, the user machine could have previously acquired the appropriate one or more cryptographic keys needed to unsecure the secured electronic file and, in such case, the user machine can unsecure the secured electronic file without connecting to the network (i.e., off-line). Regardless, after expiration of the retention period for the secured electronic document, the appropriate one or more cryptographic keys needed to unsecure the secured electronic file are expired (e.g., at both the access server 602/key store 606 and the user machines). Consequently, following the expiration of the retention period, the appropriate one or more cryptographic keys are no longer usable, thus access to the secured electronic document is prevented. The access server 602 and/or the user machine normally also require the user to be authorized to access the electronic file prior to delivery or usage of at least certain cryptographic keys from the key store 606. Typically, the cryptographic keys needed to unsecure a secured electronic file are private keys.

Nevertheless, once the restrictions and/or authorizations have been satisfied and the private keys have been supplied, the private keys are usable to unsecure the secured electronic files, provided the private keys have not expired.

Figure 7:
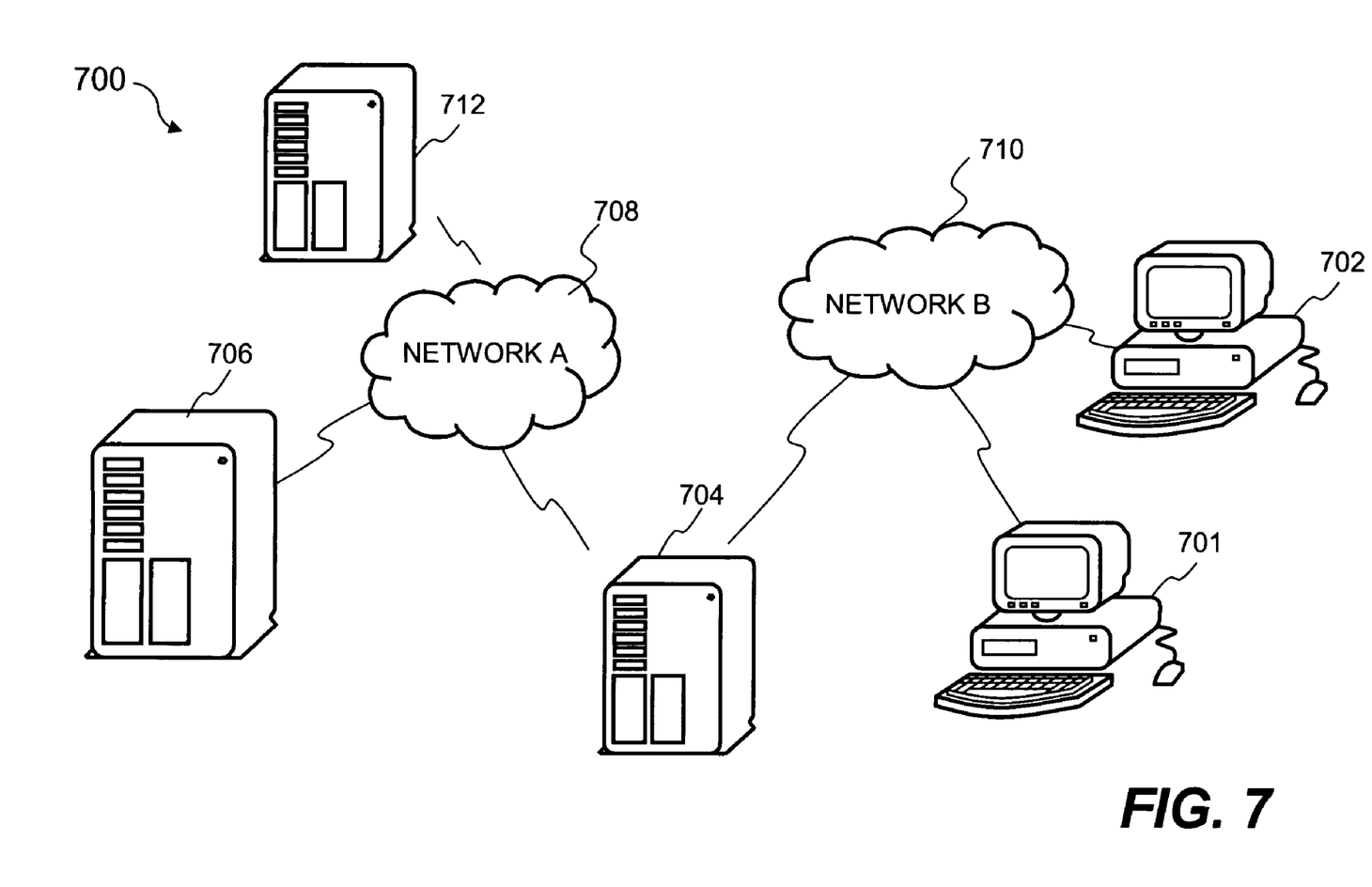
FIG. 7 shows a basic security system in which the invention may be practiced in accordance with one embodiment thereof.

FIG. 7 shows a basic security system 700 in which the invention may be practiced in accordance with one embodiment thereof. The security system 700 may be employed in an enterprise or inter-enterprise environment. It includes a first server 706 (also referred to as a central server) providing centralized access management for the enterprise. The first server 706 can control restrictive access to files secured by the security system 700 as well as file (e.g., document) retention. To provide dependability, reliability and scalability of the system, one or more second servers 704 (also referred to as local servers, of which one is shown) may be employed to provide backup or distributed access management for users or client machines serviced locally. The server 704 is coupled to a network 708 and a network 710. For illustration purposes, there are two client machines 701 and 702 being serviced by the local server 704. Alternatively, one of the client machines 701 and 702 may be considered as a networked storage device.

Secured files may be stored in any one of the devices 701, 702, 704 and 706. When a user of the client machine 701 attempts to exchange a secured file with a remote destination 712 being used by an external user, the processes discussed above can be utilized to ensure that the requested secure file is delivered without compromising the security imposed on the secured file.

According to one embodiment, a created document is caused to go through an encryption process that is preferably transparent to a user. In other words, the created document is encrypted or decrypted under the authoring application so that the user is not aware of the process. One or more keys, such as a user key and a document retention access key, can be used to retrieve a file key to decrypt an encrypted document. Typically, the user key is associated with an access privilege for the user or a group of users, and the document retention access key is associated with a retention period imposed on the created document. For a given secured document, only a user with proper access privileges can access the secured document and then only after a time restriction, if present, is satisfied.

In one setting, a secured document may be uploaded via the network 710 from the client computer 701 to a computing or storage device 702 that may serve as a central repository. Although not necessary, the network 710 can provide a private link between the computer 701 and the computing or storage device 702. Such link may be provided by an internal network in an enterprise or a secured communication protocol (e.g., VPN and HTTPS) over a public network (e.g., the Internet). Alternatively, such link may simply be provided by a TCP/IP link. As such, secured documents on the computing or storage device 702 may be remotely accessed.

In another setting, the computer 701 and the computing or storage device 702 are inseparable, in which case the computing or storage device 702 may be a local store to retain secured documents or receive secured network resources (e.g., dynamic Web contents, results of a database query, or a live multimedia feed). Regardless of where the secured documents or secured resources are actually located, a user, with proper access privileges and within retention periods, can access the secured documents or resources from the client computer 701 or the computing or storage device 702 using an application (e.g., Microsoft Internet Explorer, Microsoft Word or Adobe Acrobat Reader).

Accordingly, respective local modules in local servers, in coordination with the central server, form a distributed mechanism to provide not only distributed access control enforcement but also file (e.g., document) retention. Such distributed access control enforcement ensures the dependability, reliability and scalability of centralized access control management undertaken by the central server for an entire enterprise or a business location.

Figure 8:
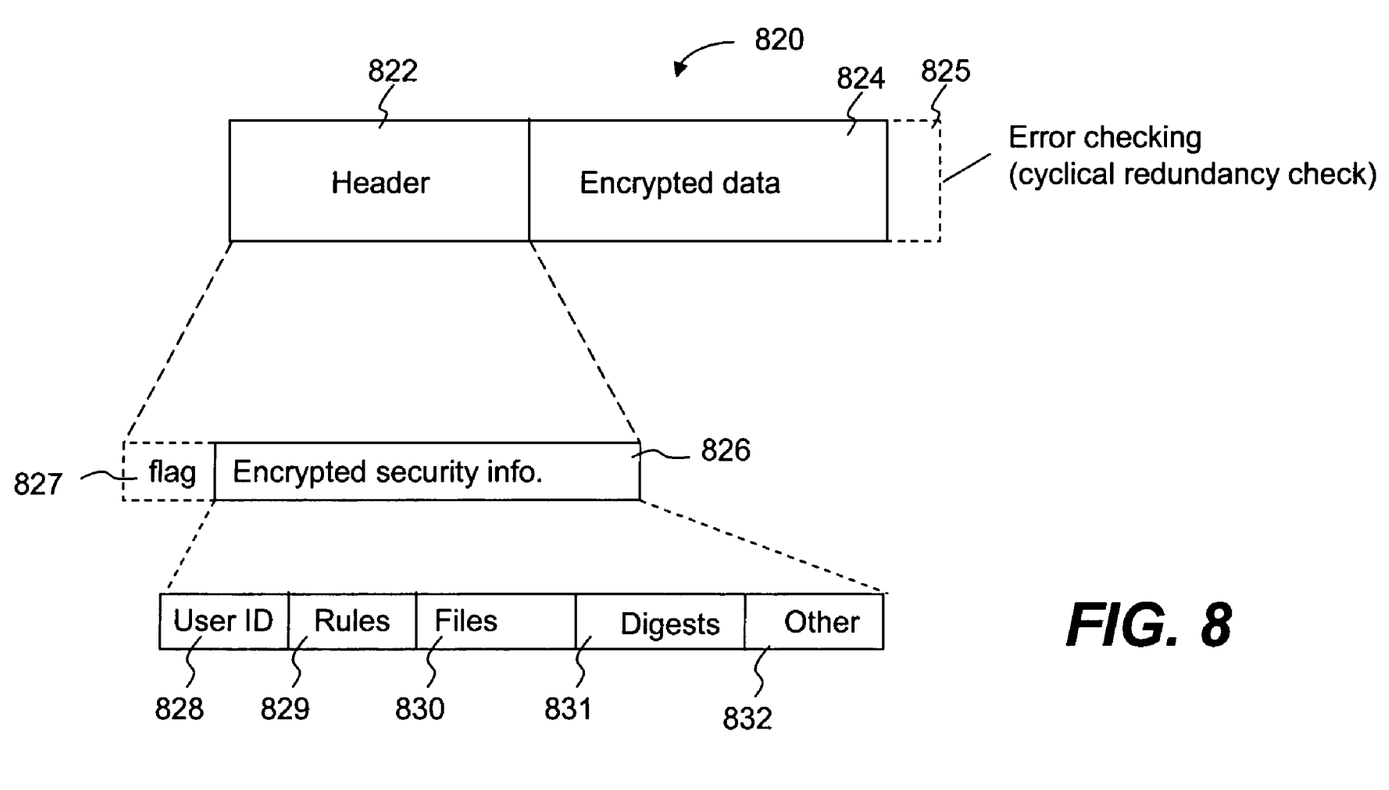
FIG. 8 shows an exemplary data structure of a secured file that may be used in one embodiment of the invention.

FIG. 8 shows an exemplary data structure 820 of a secured file that may be used in one embodiment of the invention. The data structure 820 includes two portions: a header (or header portion) 822 and encrypted data (or an encrypted data portion) 824. The header 822 can be generated in accordance with a security template associated with a data store and thus provides restrictive access to the data portion 824 which, for example, is an encrypted version of a plain file. Optionally, the data structure 820 may also include an error-checking portion 825 that stores one or more error-checking codes, for example, a separate error-checking code for each block of encrypted data 824. These error-checking codes may also be associated with a Cyclical Redundancy Check (CRC) for the header 822 and/or the encrypted data 824. The header 822 includes a flag bit or signature 827 and security information 826 that is in accordance with the security template for the data store. According to one embodiment, the security information 826 is encrypted and can be decrypted with a user key associated with an authenticated user (or requester).

The security information 826 can vary depending upon implementation. However, as shown in FIG. 8, the security information 826 includes a user identifier (ID) 828, access policy (access rules) 829, keys (cryptographic keys) 830, digests 831, and other information 832. Although multiple user identifiers may be used, a user identifier 828 is used to identify a user or a group that is permitted to access the secured file. The access rules 829 provide restrictive access to the encrypted data portion 824. The keys 830 are cipher keys (and/or pointers or identifiers therefor) that, once obtained, can be used to decrypt the encrypted data portion 824 and thus, in general, are protected. The digests 831 are digests for the secured file, such as a super digest and a plurality of lower level digests. In one implementation of the data structure 820, at least one of the keys 830 is encrypted in conjunction with the access rules 829. In another implementation of the data structure 820, at least one of the keys 830 is a file retention access key or is a key encrypted with a file retention access key, either of which can possibly be further protected by the access rules 829. The other information 831 is an additional space for other information to be stored within the security information 826. For example, the other information 831 may be used to include other information facilitating secure access to the secured file, such as version number or author identifier.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include tangible media such as read-only memory, random-access memory, CD-ROMs, DVDs, magnetic tape, and optical storage devices. The computer readable medium can also be distributed over network-coupled computer systems so that the computer readable code is stored and executed in a distributed fashion.

The various embodiments, implementations and features of the invention noted above can be combined in various ways or used separately. Those skilled in the art will understand from the description that the invention can be equally applied to or used in various other settings with respect to different combinations, embodiments, implementations or features as provided in the description herein.

The advantages of the invention are numerous. Different embodiments or implementations may yield one or more of the following advantages. One advantage of the invention is that re-calculation of a digest following a modification to an electronic file can be reduced by utilizing the multi-level digest techniques associated with the invention. Another advantage of the invention is that multi-level digests can be used to compare files having a proprietary format. For example, files having an encrypted file format can be compared by using the top level digest, without having to decrypt any portion of the electronic file. As another example, the top level digest can also be used to compare a non-encrypted electronic file with an encrypted electronic file to see if the content of the electronic files is the same.

The foregoing description of embodiments is illustrative of various aspects/embodiments of the present invention. Various modifications to the invention can be made to the preferred embodiments by those skilled in the art without departing from the true spirit and scope of the invention as defined by the appended claims. Accordingly, the scope of the present invention is defined by the appended claims rather than the foregoing description of embodiments.

What is claimed is:

1. A method for generating an encrypted electronic file, said method comprising:

identifying, using a processing device, an electronic file to be encrypted;

obtaining, using the processing device, a first block of data from the identified electronic file;

determining, using the processing device, a first block digest for the first block of data;

encrypting, using the processing device, the first block of data;

storing, using the processing device, the encrypted first block of data and the first block digest to an encrypted electronic file;

repeating said obtaining, said determining, said encrypting and said storing for each block of data from the identified electronic file until additional block digests have been determined for the each block of data from the identified electronic file;

determining, using the processing device, a super digest for the identified electronic file from the first block digest and the additional block digests; and storing, using the processing device, the super digests to the encrypted electronic file.

2. A method as recited in claim 1, wherein storing the super digest comprises:

storing the super digest in a header portion of the encrypted electronic file.

3. A method as recited in claim 1, wherein storing the super digest comprises:
storing at least the super digest in a header portion of the encrypted electronic file; and
storing the block digests in a data portion of the encrypted electronic file in a manner such that the block digests are interspersed throughout the data portion.

4. A method as recited in claim 1, wherein the determining a super digest comprises:
determining intermediate digests from the block digests; and
determining the super digests from the intermediate digests.

5. A method for determining a super digest for an encrypted electronic file that has been modified, comprising:
determining, using a processing device, a first block digest for an unencrypted modified block of data;
encrypting, using the processing device, the modified block of data;
storing, using the processing device, the encrypted modified block of data and the first block digest to the encrypted electronic file;
determining, using the processing device, the super digest for the electronic file from the first block digest and additional block digests; and
storing, using the processing device, the super digest to the encrypted file.

6. A method as recited in claim 5, wherein the modification to the encrypted electronic file affects at least one but not all of the blocks of data of the encrypted electronic file.

7. A method as recited in claim 5, wherein the determining the super digest comprises:
determining intermediate digests from the block digests; and
determining the super digest from the intermediate digests.

8. A method for comparing electronic files, said method comprising:
obtaining, using a processing device, a first super digest for a first file, the first super digest being previously determined from a first plurality of digests determined from each block of data from the first file;
obtaining, using the processing device, a second super digest for a second file, the second super digest being previously determined from a second plurality of digests determined from each block of data from the second file;
comparing, using the processing device, the first super digest with the second super digest; and
concluding, using the processing device, that the first file is the same as the second file if said comparing indicates that the first super digest is the same as the second super digest.

9. A method as recited in claim 8, wherein the first super digest is provided within the first file, and wherein the second super digest is provided within the second file.

10. A method as recited in claim 8, wherein the first super digest is stored in a header of the first file, and wherein the second super digest is stored in a header of the second file.

11. A method as recited in claim 8, wherein the first file and the second file are encrypted data files, the encrypted data files being encrypted using a block encryption technique.

12. A method as recited in claim 11, wherein the first super digest is based on a plurality of block digests corresponding to portions of the first file, and wherein the second super digest is based on a plurality of block digests corresponding to portions of the second file.

13. A method as recited in claim 11, wherein the first super digest is determined from a plurality of first intermediate digests that are determined from a plurality of block digests determined from blocks of data from the first file, and wherein the second super digest is determined from a plurality of second intermediate digests that are determined from a plurality of block digests determined from blocks of data from the second file.

14. A tangible computer-readable medium having stored thereon computer-executable instructions that, in response to execution by a computing device, cause the computing device to perform a method of encrypting an electronic file, the method comprising:
identifying, using a processing device, an electronic file to be encrypted;
obtaining, using the processing device, a first block of data from the identified electronic file;
determining, using the processing device, a first block digest for the first block of data;
encrypting, using the processing device, the first block of data;
storing, using the processing device, the encrypted first block of data and the first block digest to an encrypted electronic file;
repeating said obtaining, said determining, said encrypting, and said storing for each block of data from the identified electronic file until additional block digests have been determined for the each block of data;
determining, using the processing device, a super digest for the identified electronic file from the first block digest and the additional block digests; and
storing, using the processing device, the super digest to the encrypted electronic file.

15. A tangible computer-readable medium as recited in claim 14, wherein the determining a super digest comprises:
determining one or more levels of intermediate digests from the block digests; and
determining the super digest from the upper-most level of the intermediate digests.

16. The method of claim 1, further comprising using the super digest to uniquely identify the electronic file.

17. The method of claim 8, further comprising using the first super digest to uniquely identify the first file and the second super digest to uniquely identify the second file.

18. A method as recited in claim 5, wherein the modification to the encrypted electronic file affects only one block of data, that is, the modified block of data to the encrypted electronic file.

19. The method of claim 5, further comprising repeating said determining, said encrypting, and said storing for additional unencrypted modified blocks of data before said determining the super digest is performed.

20. The method of claim 5, further comprising using the super digest to uniquely identify the modified electronic file.

21. A computer program product comprising a computer useable medium having computer program logic recorded thereon, the computer program logic comprising:
first computer code means for identifying an electronic file to be encrypted;
second computer code means for obtaining a first block of data from the identified electronic file;
third computer code means for determining a first block digest for the first block of data;
fourth computer code means for encrypting the first block of data;

fifth computer code means for storing the encrypted first block and the first block digest to an encrypted electronic file;

sixth computer code means for repeating said obtaining, said determining, said encrypting and said storing for each block of data from the identified electronic file until additional block digests have been determined for the each block of data;

seventh computer code means for determining a super digest for the identified electronic file from the first block digest and the additional block digests; and eighth computer code means for storing the super digest to the encrypted data file.

* * * * *